(12) United States Patent
Cluxton

(10) Patent No.: US 12,131,322 B2
(45) Date of Patent: *Oct. 29, 2024

(54) SYSTEM, METHOD, AND APPARATUS FOR PERSONALIZING TRANSACTIONS

(71) Applicant: Visa International Service Association, San Francisco, CA (US)

(72) Inventor: Vincent Travis Cluxton, Colorado Springs, CO (US)

(73) Assignee: Visa International Service Association, San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/722,461

(22) Filed: Apr. 18, 2022

(65) Prior Publication Data

US 2022/0245633 A1    Aug. 4, 2022

Related U.S. Application Data

(63) Continuation of application No. 16/445,892, filed on Jun. 19, 2019, now Pat. No. 11,308,491.

(51) Int. Cl.
   *G06Q 20/40* (2012.01)
   *G06Q 10/107* (2023.01)

(52) U.S. Cl.
   CPC ........... *G06Q 20/40* (2013.01); *G06Q 10/107* (2013.01)

(58) Field of Classification Search
   CPC .............................. G06Q 20/40; G06Q 10/107
   See application file for complete search history.

(56) References Cited

U.S. PATENT DOCUMENTS

| | | | |
|---|---|---|---|
| 7,225,994 B2 | 6/2007 | Finkelstein | |
| 7,988,058 B2 | 8/2011 | Englebardt et al. | |
| 9,203,869 B2* | 12/2015 | Prodan | H04N 21/6371 |
| 9,990,626 B1* | 6/2018 | LaBanca, Jr. | G07F 19/207 |
| 10,387,626 B2* | 8/2019 | Evans | G06Q 30/04 |
| 10,552,819 B1* | 2/2020 | Gupta | G06Q 20/3272 |
| 2002/0083995 A1* | 7/2002 | Dudek | G06Q 10/06 |
| | | | 141/2 |
| 2011/0180441 A1* | 7/2011 | Bach | G16H 10/60 |
| | | | 235/375 |
| 2012/0246079 A1* | 9/2012 | Wilson | G06Q 20/3226 |
| | | | 705/67 |
| 2012/0278155 A1* | 11/2012 | Faith | G06V 40/16 |
| | | | 705/44 |

(Continued)

OTHER PUBLICATIONS

Guilherme Folego, "Pay Voice: Point of Sale Recognition for Visually Impaired People," dated Dec. 14, 2018, Cornell University, https://arxiv.org/abs/1812.05740 (Year: 2018).*

(Continued)

*Primary Examiner* — Raven E Yono
(74) *Attorney, Agent, or Firm* — The Webb Law Firm

(57) ABSTRACT

Described herein are systems, methods, and apparatuses for personalizing transactions. The systems, methods, and apparatuses may include an acceptance device receiving an account credential, generating a transaction request message, transmitting the transaction request message, and receiving an authorization response message comprising a multimedia object associated with the account credential. The acceptance device may output the multimedia object.

12 Claims, 6 Drawing Sheets

400

| Account Credential | Multimedia Object | URI / Network Path | Default Output Device |
|---|---|---|---|
| 1234 1234 1234 1234 | Song2 | www.multimediaobjectwebsite.com/song1.mp3 | POS |
| 4321 4321 4321 4321 | Video3 | www.multimediaobjectwebsite.com/video3.mpeg | POS |
| 5555 5555 5555 5555 | Advertisement1 | www.POSadnetworkfilestore.com/advert1.mpeg | Smartphone number ending in 1234 |
| username@paymentnetworkcheckout | Payment Network Official Sound | //localhost/paymentsound.wav | POS |

(56) References Cited

U.S. PATENT DOCUMENTS

| | | | | |
|---|---|---|---|---|
| 2013/0198071 A1* | 8/2013 | Jurss | ................... | G06Q 20/108 |
| | | | | 705/42 |
| 2015/0178761 A1* | 6/2015 | O'Connor | .......... | G06Q 30/0226 |
| | | | | 705/14.27 |
| 2015/0332239 A1* | 11/2015 | Anderson | ............... | H04L 67/02 |
| | | | | 705/21 |
| 2016/0275472 A1* | 9/2016 | Rajamannar | ....... | G06Q 30/0268 |
| 2017/0046716 A1* | 2/2017 | Sheehan | ................ | G06Q 20/12 |
| 2017/0351771 A1* | 12/2017 | Gallenbacher | ...... | G06F 16/9535 |
| 2020/0178018 A1* | 6/2020 | Bittner | ................... | H04S 7/305 |

OTHER PUBLICATIONS

Katharine Kemp, "Revel Systems Launches New iPad POS Accessibility Bundle for the Visually Impaired," dated Apr. 30, 2014, PR Newswire, https://www.prnewswire.com/news-releases/revel-systems-launches-new-ipad-pos-accessibility-bundle-for-the-visually-impaired-257321891.html (Year: 2014).*

Mohammed Misbhauddin, "Towards a Proximity-Aware, Accessible and Personalized Public Digital Terminal An Initial Study," dated Apr. 2018, IEEE, https://ieeexplore.ieee.org/document/8593129?source=IQplus (Year: 2018).*

* cited by examiner

| Account Credential | Multimedia Object | URI / Network Path | Default Output Device |
|---|---|---|---|
| 1234 1234 1234 1234 | Song2 | www.multimediaobjectwebsite.com/song1.mp3 | POS |
| 4321 4321 4321 4321 | Video3 | www.multimediaobjectwebsite.com/video3.mpeg | POS |
| 5555 5555 5555 5555 | Advertisement1 | www.POSadnetworkfilestore.com/advert1.mpeg | Smartphone number ending in 1234 |
| username@paymentnetworkcheckout | Payment Network Official Sound | //localhost/paymentsound.wav | POS |

SYSTEM, METHOD, AND APPARATUS FOR PERSONALIZING TRANSACTIONS

CROSS REFERENCE TO RELATED APPLICATION

This application is a continuation of U.S. patent application Ser. No. 16/445,892, filed on Jun. 19, 2019, the disclosure of which is hereby incorporated by reference in its entirety.

BACKGROUND

1. Technical Field

This disclosure pertains to dynamic information storage or retrieval. More specifically, the disclosure pertains to the selection, storage, retrieval, and playback of multimedia objects as part of a transaction authorization.

2. Technical Considerations

Electronic payment technology, including credit cards, debit cards, and alternative form factors such as smartphones, are widely used in performing transactions for goods and services. However, the user experience of conducting a payment transaction is not significantly personalized to the cardholder and details relating to the approval or decline of a transaction are not easily ascertainable to the visually impaired. What is needed is a method, system, and apparatus for personalizing transactions involving the storage, retrieval, delivery, and output of a personalized or personally selected multimedia object at the time of a transaction.

SUMMARY

Non-limiting embodiments or aspects of the disclosure are directed to systems, methods, and apparatuses for performing a transaction using an account credential, and as part of the authorization response for that transaction, providing and outputting a multimedia object associated with the account credential. A benefit of the non-limiting embodiments or aspects disclosed herein include the personalization and customization of a transaction experience by outputting user-selectable multimedia objects delivered using existing messaging flows and structures to output capable devices. Further benefits including minimizing the amount of network traffic needed and the number of configuration changes required, while also providing accessibility benefits to the visually impaired by enabling the audible differentiation of accounts and authorization response messages, thereby permitting such individuals to know and confirm that a particular account credential was used, and that the transaction was approved to avoid the possibility of being "double-charged" by an unscrupulous merchant.

According to some non-limiting embodiments or aspects, provided is a method for personalizing a transaction comprising: receiving, by an acceptance device, an account credential; generating, by the acceptance device, a transaction request message comprising at least the account credential; transmitting, by the acceptance device, the transaction request message; receiving, by the acceptance device, an authorization response message indicative of whether the transaction was approved or declined, wherein the authorization response message further comprises a multimedia object associated with the account credential; and outputting, by the acceptance device, the multimedia object.

In some non-limiting embodiments or aspects, the transaction request message and the authorization response message are formatted according to a messaging specification, as defined in ISO 8583.

In some non-limiting embodiments or aspects, the multimedia object comprises a uniform resource identifier.

In some non-limiting embodiments or aspects, the method further comprises downloading, by the acceptance device, the multimedia object using at least the uniform resource identifier.

In some non-limiting embodiments or aspects, the step of outputting the multimedia object comprises at least one of audibly playing the multimedia object on a speaker, visually displaying the multimedia object on a display screen, or any combination thereof.

In some non-limiting embodiments or aspects, the step of receiving, by the acceptance device, the account credential comprises retrieving, from a memory, the account credential.

According to some non-limiting embodiments or aspects, provided is a method of personalizing a transaction comprising: receiving, by at least one server, a transaction request message comprising at least an account credential; retrieving, by the at least one server, a multimedia object associated with the account credential; generating, by the at least one server, an authorization response message, wherein the authorization response message comprises at least an indication of transaction approval and the multimedia object; and transmitting, by the at least one server, the authorization response message to an output device.

In some non-limiting embodiments or aspects, the authorization response message is formatted according to a messaging specification, as defined in ISO 8583.

In some non-limiting embodiments or aspects, the step of generating, by the at least one server, an authorization response message comprises: receiving, by the at least one server, an issuer-generated authorization response message comprising at least an indication of transaction approval; and injecting, by the at least one server, the multimedia object into the issuer-generated authorization response message.

In some non-limiting embodiments or aspects, the transaction request message further comprises a request to associate a multimedia object with the account credential.

In some non-limiting embodiments or aspects, the output device is associated with the account credential.

In some non-limiting embodiments or aspects, the method further comprises receiving, by the at least one server, an indication of whether the output device is capable of outputting the multimedia object.

In some non-limiting embodiments or aspects, the method further comprises receiving, by the at least one server, a selection of the multimedia object; and storing, by the at least one server, an association between the multimedia object and the account credential.

According to some non-limiting embodiments or aspects, provided is a system for personalizing a transaction, comprising: an acceptance device; and at least one server configured to: receive a transaction request message comprising at least an account credential; retrieve a multimedia object based on the account credential; generate an authorization response message, wherein the authorization response message comprises at least an indication of transaction approval and the multimedia object; and transmit the authorization response message; wherein the acceptance device is configured to: receive the account credential; generate the transaction request message; transmit the transaction request message; receive the authorization response message; and output the multimedia object.

In some non-limiting embodiments or aspects, at least one of the transaction request message, the authorization response message, or any combination thereof, is formatted according a messaging specification, as defined in ISO 8583.

In some non-limiting embodiments or aspects, the multimedia object comprises a uniform resource identifier.

In some non-limiting embodiments or aspects, the acceptance device is further configured to download the multimedia object using at least the uniform resource identifier.

In some non-limiting embodiments or aspects, the acceptance device is further configured to output the multimedia object by at least one of audibly playing the multimedia object on a speaker, visually displaying the multimedia object on a display screen, or any combination thereof.

In some non-limiting embodiments or aspects, the at least one server is further configured to: receive a selection of the multimedia object; and store an association between the multimedia object and the account credential.

In some non-limiting embodiments or aspects, the transaction request message further comprises an indication of whether the acceptance device is capable of outputting the multimedia object.

Further non-limiting embodiments or aspects are set forth in the following numbered clauses:

Clause 1: A method for personalizing a transaction, comprising: receiving, by an acceptance device, an account credential; generating, by the acceptance device, a transaction request message comprising at least the account credential; transmitting, by the acceptance device, the transaction request message; receiving, by the acceptance device, an authorization response message indicative of whether the transaction was approved or declined, wherein the authorization response message further comprises a multimedia object associated with the account credential; and outputting, by the acceptance device, the multimedia object.

Clause 2: The method of clause 1, wherein the transaction request message and the authorization response message are formatted according to a messaging specification, as defined in ISO 8583.

Clause 3: The method of clauses 1 or 2, wherein the multimedia object comprises a uniform resource identifier.

Clause 4: The method of any of clauses 1-3 further comprising, downloading, by the acceptance device, the multimedia object using at least the uniform resource identifier.

Clause 5: The method of any of clauses 1-4, wherein the step of outputting the multimedia object comprises at least one of audibly playing the multimedia object on a speaker, visually displaying the multimedia object on a display screen, or any combination thereof.

Clause 6: The method of any of clauses 1-5, wherein the step of receiving, by the acceptance device, the account credential comprises retrieving, from a memory, the account credential.

Clause 7: A method for personalizing a transaction, comprising: receiving, by at least one server, a transaction request message comprising at least an account credential; retrieving, by the at least one server, a multimedia object associated with the account credential; generating, by the at least one server, an authorization response message, wherein the authorization response message comprises at least an indication of transaction approval and the multimedia object; and transmitting, by the at least one server, the authorization response message to an output device.

Clause 8: The method of clause 7, wherein the authorization response message is formatted according to a messaging specification, as defined in ISO 8583.

Clause 9: The method of clauses 7 or 8, wherein the step of generating, by the at least one server, an authorization response message comprises: receiving, by the at least one server, an issuer-generated authorization response message comprising at least an indication of transaction approval; and injecting, by the at least one server, the multimedia object into the issuer-generated authorization response message.

Clause 10: The method of any of clauses 7-9, wherein the transaction request message further comprises a request to associate the multimedia object with the account credential.

Clause 11: The method of any of clauses 7-10, wherein the output device is associated with the account credential.

Clause 12: The method of any of clauses 7-11 further comprising, receiving, by the at least one server, an indication of whether the output device is capable of outputting the multimedia object.

Clause 13: The method of any of clauses 7-12 further comprising: receiving, by the at least one server, a selection of the multimedia object; and storing, by the at least one server, an association between the multimedia object and the account credential.

Clause 14: A system for personalizing a transaction, comprising: an acceptance device; and at least one server configured to: receive a transaction request message comprising at least an account credential; retrieve a multimedia object based on the account credential; generate an authorization response message, wherein the authorization response message comprises at least an indication of transaction approval and the multimedia object; and transmit the authorization response message; wherein the acceptance device is configured to: receive the account credential; generate the transaction request message; transmit the transaction request message; receive the authorization response message; and output the multimedia object.

Clause 15: The system of clause 14, wherein at least one of the transaction request message, the authorization response message, or any combination thereof, is formatted according to a messaging specification, as defined in ISO 8583.

Clause 16: The system of clauses 14 or 15, wherein the multimedia object comprises a uniform resource identifier.

Clause 17: The system of any of clauses 14-16, wherein the acceptance device is further configured to download the multimedia object using at least the uniform resource identifier.

Clause 18: The system of any of clauses 14-17, wherein the acceptance device is further configured to output the multimedia object by at least one of audibly playing the multimedia object on a speaker, visually displaying the multimedia object on a display screen, or any combination thereof.

Clause 19: The system of any of clauses 14-18, wherein the at least one server is further configured to: receive a selection of the multimedia object; and store an association between the multimedia object and the account credential.

Clause 20: The system of any of clauses 14-19, wherein the transaction request message further comprises an indication of whether the acceptance device is capable of outputting the multimedia object.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

FIG. 4 depicts an illustrative non-limiting example of an association between an account and a multimedia object.

DETAILED DESCRIPTION

Figure 1:
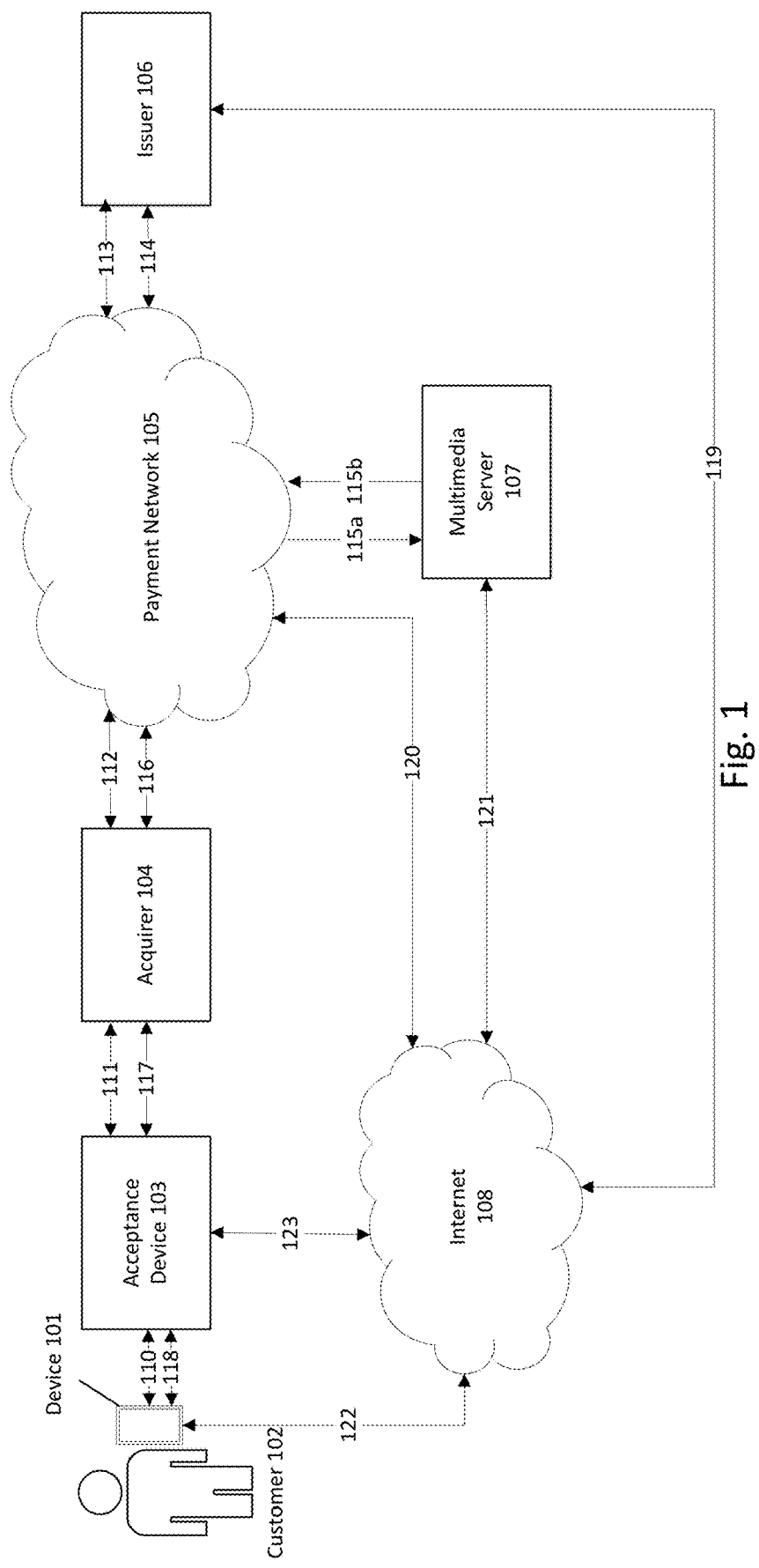
FIG. 1 depicts an illustrative non-limiting example of a system for personalizing a transaction and outputting a multimedia object in accordance with some non-limiting embodiments or aspects of the present disclosure.

In the following description, various non-limiting embodiments or aspects will be described. For purposes of explanation, specific configurations and details are set forth in order to provide a thorough understanding of some non-limiting embodiments or aspects. However, it will also be apparent to one skilled in the art that the non-limiting embodiments or aspects may be practiced without the specific details. Furthermore, well-known features may be omitted or simplified in order not to obscure the non-limiting embodiments or aspects being described. Prior to discussing non-limiting embodiments or aspects of the disclosure, description of some terms may be helpful in understanding these non-limiting embodiments or aspects.

As used herein, the term "acceptance device" may be any suitable device that can accept or initiate a transaction. Non-limiting examples of an acceptance device may include a point-of-sale system, cash register, transaction processing computer, an authentication computer, a computing device, or a merchant server, such as a web server or e-commerce payment gateway configured to receive payment or transaction information. An acceptance device may further contain at least one processor, memory, secure element, speaker, display, wireless radio, card reader, or any other suitable component, or any combination thereof.

As used herein, the term "account credential," "account number," or "payment credential" may refer to any suitable information associated with an account (e.g. a payment account and/or payment device associated with the account). Such information may be directly related to the account or may be derived from information related to the account.

Examples of account information may include a PAN (primary account number or "account number"), user name, expiration date, CVV (card verification value), dCVV (dynamic card verification value), CVV2 (card verification value 2), CVC3 card verification values, etc.

As used herein, the term "authorization request message" may refer to a message sent to request an authorization for a transaction. An authorization request message may comply with ISO 8583, which is a standard for the exchange of messages in a financial transaction system. An authorization request message according to other embodiments may comply with other suitable standards. An authorization request message may be generated by an acceptance device or a server and may be sent to an issuing financial institution directly or through a payment network.

As used herein, the term "communication" and "communicate" refer to the receipt or transfer of one or more signals, messages, calls, commands, or other type of data. For one unit (e.g., any device, system, or component thereof) to be in communication with another unit means that the one unit is able to receive data from and/or transmit data to the other unit. A communication may use a direct or indirect connection and may be wired and/or wireless in nature. Additionally, two units may be in communication with each other even though the data transmitted may be modified, processed, routed, etc., between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

A "communication channel" may refer to any suitable path for communication between two or more entities. Any suitable communications protocols may be used for generating a communications channel. A communication channel may in some instances comprise a "secure communication channel" or a "tunnel," either of which may be established in any known manner, including the use of mutual authentication and a session key and establishment of a secure communications session. However, any method of creating a secure communication channel may be used, and communication channels may be wired or wireless, as well as long-range, short-range, or medium-range.

As used herein, the term "computing device" may refer to one or more electronic devices that are configured to directly or indirectly communicate with or over one or more networks. The computing device may be a client device, a mobile device, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface.

As used herein, the term "credential" may refer to any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

As used herein, the term "multimedia object" may refer to a digital file containing multimedia content including audio, images, animations, video, vibration patterns, and interactive content. Multimedia objects may be represented in various formats and computer file types or may be represented by a pointer, network address, or uniform resource indicator (URI) denoting a location at which a multimedia file may be located and/or retrieved. Multimedia objects may be output by a computing device with suitable output capability and may be observable by a device user or other entity.

As used herein, the term "payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

As used herein, a "secure element" may include a secure computer memory in an electronic device capable of storing sensitive data or applications. A secure element may, but need not be, physically isolated from other memory in an electronic device. A secure element may comprise, or may be contained within, a hardware security module, a software security module, or other mechanism providing for secure and controlled access to the data stored within it. A secure element may further comprise a dedicated crypto-processor used for accessing its contents and executing secure operations.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server that is recited as performing a first step or function may refer to the same or different server recited as performing a second step or function.

Turning now to the figures, FIG. 1 depicts an illustrative non-limiting example of a system for personalizing a transaction and outputting a multimedia object in accordance with some non-limiting embodiments or aspects of the present disclosure. In some non-limiting embodiments or aspects the system may include an acceptance device 103, an acquirer 104, a payment network 105, and an issuer 106, all of which may be servers operated by one or more entities. It should be appreciated by a person of skill in the art that there are many possible configurations for such systems and that such systems could contain fewer or more entities, each of which may perform some or all of the tasks of the others, and may be owned or operated by various entities, including merchants, payment networks, and financial institutions. As such, FIG. 1 depicts only one illustrative non-limiting example of such a system. Communications between entities in FIG. 1 are shown as bi-directional as they may involve data exchanged to and from entities.

In some non-limiting embodiments or aspects, customer 102 may communicate with a merchant's acceptance device 103 and attempt to perform a transaction using computing device 101, which may be a smartphone, portable computer, smart-watch or other wearable, payment card, or other device containing payment account data and capable of initiating a transaction or providing such account credentials during the course of a payment transaction. In some non-limiting examples or aspects, computing device 101 may be capable of outputting a multimedia object via a speaker, display screen, other output mechanism, or any combination thereof. At 110, in some non-limiting embodiments, acceptance device 103 may interrogate or read computing device 101 to obtain account credentials, or computing device 101 may initiate the transmission of account credentials to acceptance device 103. As part of such interrogation or initiation, acceptance device 103 or computing device 101 may retrieve account credentials from a secure memory, such as a secure element. In some non-limiting examples, at 110, computing device 101 may also transmit to acceptance device 103 a request to select, update, or change a multimedia object that is associated with account credentials. Acceptance device 103 may generate an authorization request message containing data specific to the intended transaction, some non-limiting examples of which may include the account credential, a transaction amount, a cryptogram, acceptance device multimedia output capabilities or indicators thereof, an updated selection of the multimedia object, and/or other relevant data. In some non-limiting embodiments, the authorization request message may be formatted according to the ISO 8583 financial messaging standard.

At 111, acceptance device 103 may send the authorization request message to a server operated by acquirer 104, which may be a financial institution at which a merchant operating acceptance device 103 maintains an account. Acquirer 104 may route the authorization request message at 112 to a payment network 105, depending upon the account credentials and/or other data corresponding to a merchant or acceptance device 103. Payment network 105 may then forward the authorization request message to a server operated by issuer 106 for authorization approval or decline at 113. Issuer 106 may host one or more accounts owned by customer 102. In response to the authorization request message, issuer 106 may approve or decline the transaction, and may generate an authorization response message, which may, in some non-limiting embodiments, be formatted according to the ISO 8583 messaging standard. At 114, issuer 106 may transmit the authorization response message to payment network 105.

At 115a and 115b, payment network 105 may request and receive a multimedia object from multimedia server 107 by sending account credentials or other data corresponding to an account or a particular transaction to multimedia server 107. Multimedia server 107 may provide to payment network 105 at 115b the corresponding multimedia object. Payment network 105 may modify the authorization response message by injecting or inserting the multimedia object into the authorization response message received from issuer 106, and forwarding the authorization response message to acquirer 104 at step 116. Acquirer 104 may then forward the authorization response message to acceptance device 103 at 117. If the multimedia object comprises a uniform resource indicator (URI), or other network path location, acceptance device 103 may retrieve the multimedia object by communicating with a remote server storing the multimedia object, such as multimedia server 107. In some non-limiting embodiments or aspects, the multimedia object may be stored locally in a memory of acceptance device 103, and the received authorization response may contain a local file-path corresponding to the multimedia object. Acceptance device 103 may output the multimedia object by playing audible portions on a speaker and/or visually displaying visual portions on a display screen.

It should be appreciated by persons of skill in the art that acceptance device 103 may lack the necessary peripherals or ability to output multimedia objects. In such situations, the multimedia object may be provided to another device, such as computing device 101 or a computing device associated with customer 102, if such devices are capable of outputting a multimedia object. In some non-limiting embodiments, acceptance device 103 may provide the multimedia object to computing device 101 or another computing device via a wireless communication protocol, such as Near-Field Communications ("NFC"), Bluetooth®, WiFi®, or any other suitable wireless communications channel, as depicted at 118.

In some non-limiting embodiments, acceptance device 103 may receive the authorization response and/or the multimedia object via an Internet based communication channel, as shown at 122, from issuer 106, payment network 105, multimedia server 107, or any combination thereof, thereby bypassing acceptance device 103. Such communications are depicted in 119, 120, and 121, in which the authorization response and/or the multimedia object may be received by computing device 101 from issuer 106, payment network 105, multimedia server 107, respectively. In some non-limiting embodiments, such communications may be sent via Internet 108. Upon receipt of the multimedia object, computing device 101 may output the multimedia object using one or more speakers and/or displays.

In some non-limiting embodiments, the system in FIG. 1 may also depict an e-commerce transaction in which customer 102 utilizes computing device 101 to interact with a merchant's acceptance device 103 over the Internet to perform a transaction. In such situations, because acceptance device 103 is not in physical proximity with customer 102 and computing device 101, the output of a multimedia object by acceptance device 103 would not be observable by customer 102, and therefore not ideal. Therefore, in such situations, computing device 101 may receive the authorization response and/or the multimedia object for outputting using a speaker and/or display screen on computing device 101. In such non-limiting examples or aspects, the communications between acceptance device 103 and computing device 101 occurring at 110 and 118 may occur over an Internet-based communication channel, such as 122 and 123, providing each such device connectivity via Internet 108. In another non-limiting example, acceptance device 103 may provide the multimedia object or representation thereof to computing device 101 by extracting it from the authorization response message and separately delivering it to computing device 101.

In some non-limiting embodiments, computing device 101 may transmit to acceptance device 103 a request to select, update, or change a multimedia object that is associated with account credentials at 110. If such a request is contained in the transmission at 110, it may be carried in messages to acquirer 104, payment network 105, and/or issuer 106. Upon receipt of such a request, any suitable entity may change or update the stored association of the account credential with the multimedia object. A person of skill in the art will appreciate that such request need not carry the actual multimedia object, but instead, a selection of a remotely stored multimedia object, which may be specified using a code, network path, or URI capable of identifying such selected multimedia object.

Figure 2:
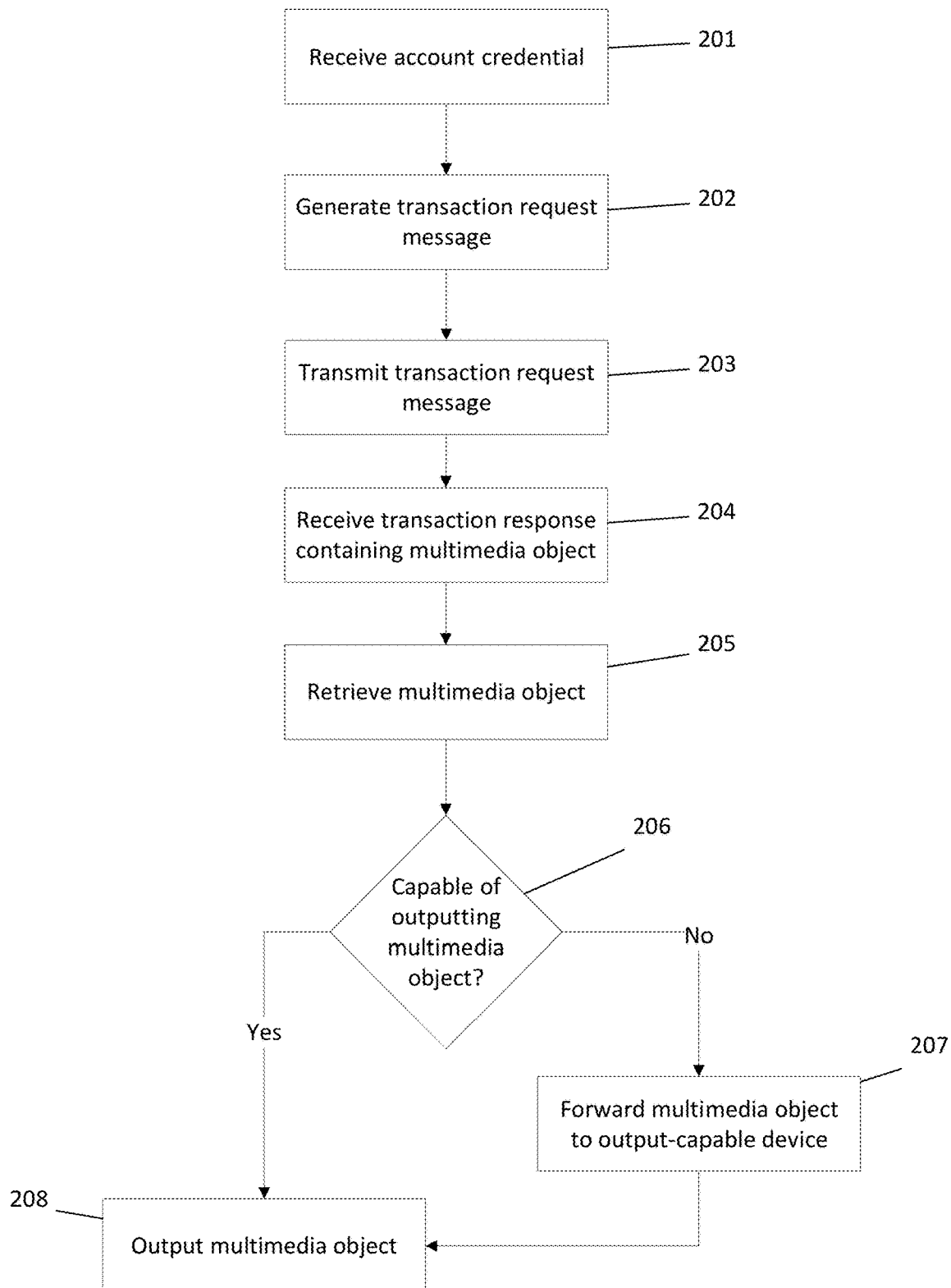
FIG. 2 depicts an illustrative non-limiting example of a decision tree for implementing a system, method, and/or process in accordance with some non-limiting embodiments or aspects of the present disclosure.

Turning now to FIG. 2, an illustrative non-limiting example of a decision tree for implementing a system, method, and/or process in accordance with some non-limiting embodiments or aspects of the present disclosure is depicted. At step 201, an acceptance device may receive an account credential from a customer device. At step 202, the acceptance device may generate a transaction request message, which may be formatted according to known industry standards, such as the ISO 8583 messaging standard, and the authorization 0100 request message defined therein. At step 203, the acceptance device may transmit the transaction request message to a financial institution or payment network. At step 204, the acceptance device may receive a transaction response indicating whether the transaction request was approved or denied, and in either case, the transaction response may contain a multimedia object or representation thereof. The transaction response message may be formatted according to industry standard formats, such as the ISO 8583 standard and the 0110 authorization response message as defined therein. Acceptance device may retrieve the multimedia object at step 205 from local memory or a remote server. If the acceptance device is capable of outputting a multimedia object, as shown at step 206, it may progress to step 208 and output the multimedia object using its speaker and/or display screen. If the acceptance device is not capable of outputting the multimedia object, it may forward the multimedia object to another output-capable computing device, as depicted at step 207. The output-capable computing device may then output the multimedia object at device at step 208.

A person of skill in the art will appreciate that the process depicted in FIG. 2 is only one example of how a transaction may be personalized in accordance with some non-limiting examples or aspects of the present disclosure, and that fewer or more steps may occur.

Figure 3:
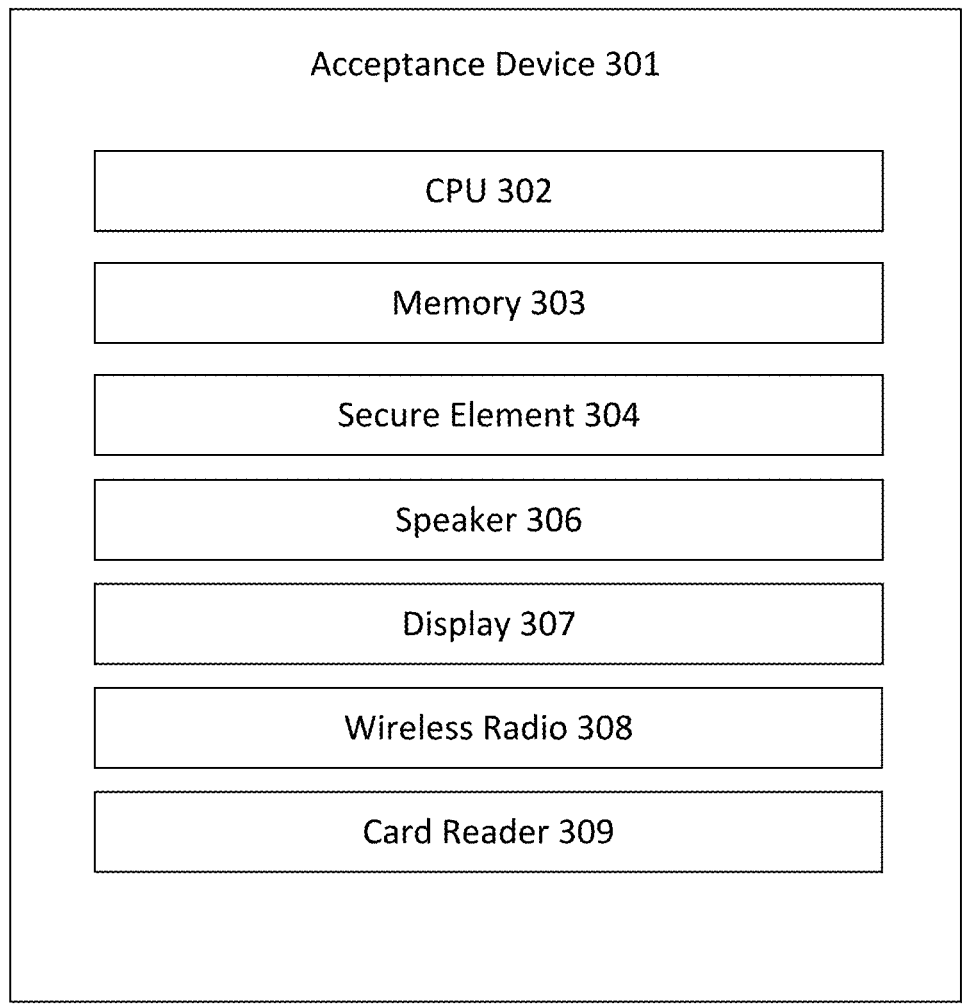
FIG. 3 depicts an illustrative non-limiting example of an acceptance device capable of outputting a multimedia object in accordance with some non-limiting embodiments or aspects of the present disclosure.

Turning now to FIG. 3, an illustrative non-limiting example of an acceptance device capable of outputting a multimedia object in accordance with some non-limiting embodiments or aspects of the present disclosure is depicted. Acceptance device 301 may contain a CPU 302, which may be a central processing unit capable of executing instructions and operations including an operating system and software executed thereupon. Acceptance device 301 may also contain a memory 303, which may be capable of storing data and instructions for execution. Memory 303 may be persistent storage, temporal storage, or a combination thereof. Acceptance device 301 may also contain a secure element 304, which may be a special purpose microprocessor containing separate secure memory for cryptographic keys, account data or credentials, and may execute certain secure applications such as applications performing the transmission or receipt of payment transaction data. In some non-limiting examples, secure element 304 need not be a separate microprocessor and may instead be a trusted execution environment or other secure memory area within CPU 302 or within memory 303. Acceptance device 301 may also contain speaker 306 and display 307 which may be capable of outputting information such as multimedia objects audibly and visually, respectively. Display 307 may be any type of suitable electronic viewing technology and may, in some non-limiting aspects or examples, also be capable of receiving tactile input, such as a touch-screen.

Acceptance device 301 may further contain one or more wireless radios, such as wireless radio 308, which may enable the establishment and use of wireless data communication channels over various wireless communication protocols, some non-limiting examples of which may include IEEE 802.11, NFC, and/or cellular communication protocols, such as LTE and 4G. Such communication channels may provide for connectivity to the public Internet or other networks, such as those operated by one or more payment networks or financial institutions. Wireless radio 308 may be used to transmit authorization request messages and to receive authorization response messages indicative of transaction approval or decline. In some non-limiting aspects or examples of the present disclosure, wireless radio 308 may further receive a multimedia object or representation thereof. Acceptance device 301 may also contain one or more card readers, such as card reader 309, which may enable acceptance device 301 to obtain information from a payment card by reading data located on a magnetic stripe, an EMV Chip, or by a "contactless" proximity interrogation and communication. In some non-limiting examples, wireless radio 308 may also function as a card reader by performing the reading of contactless cards.

Turning now to FIG. 4, an illustrative non-limiting example of an association between an account number and a multimedia object is depicted. Table 400 may reside within a multimedia server or other database accessible by an issuer, a user device, payment network, or any other suitable entity. Table 400 may contain a series of entries, and may be indexed by an account credential, or secure representation thereof. Within table 400, additional data may be stored which correspond to an account credential, such as the name or type a multimedia object, the URI or other network location of a multimedia object, and a stored default device for outputting, if known. Information about the output device may also be stored in table 400, some non-limiting examples of which may include an Internet Protocol (IP) address, MAC address, IMEI number, or telephone number corresponding to the output device, as well as its technical or output capabilities. Such information may be used in some non-limiting embodiments or aspects as an alternative or preferred output device if an acceptance device lacks the ability to output a multimedia object, or if a customer or user simply prefers for the output of a multimedia object to occur on a different device. In some non-limiting examples or aspects, upon the receipt of a request to select or update the multimedia object associated with an account credential, a server may update one or more records in table 400, including by writing new data to the "Multimedia Object" and/or "URI/Network Path" columns.

Figure 5:
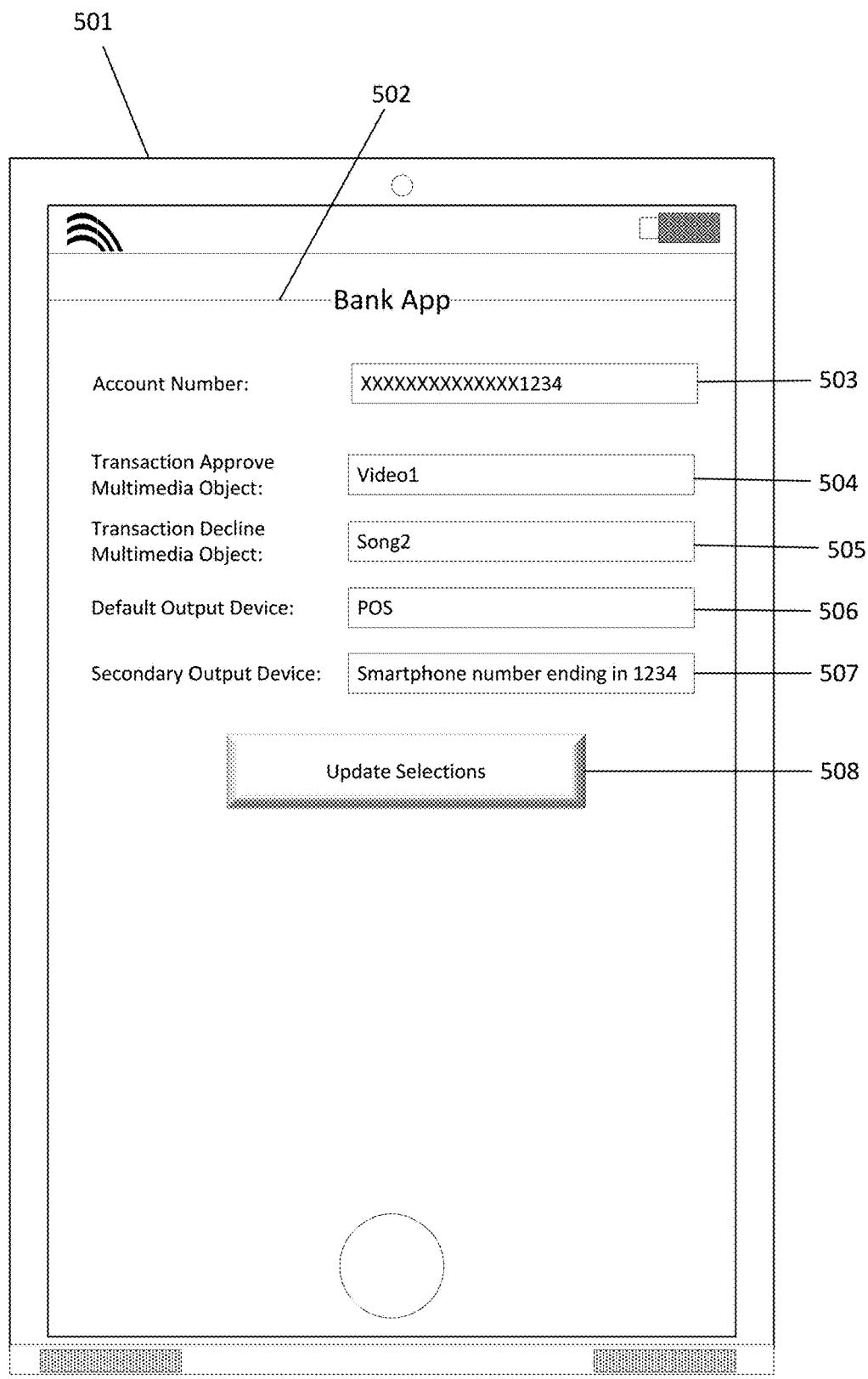
FIG. 5 depicts an illustrative non-limiting example of a user interface on a computing device for associating an account with a multimedia object.

Turning now to FIG. 5, an illustrative non-limiting example of a user interface on a computing device for associating an account with a multimedia object is depicted. Computing device 501 may be operated by a customer or cardholder, and may provide access to a financial institution via application 502, which may be a web browser. After authenticating or otherwise obtaining access, application 502 may enable a user or account holder to select or change a multimedia object associated with an account number 503. Application 502 may further enable a user or account holder to select or change different multimedia objects and associate them with different events. A multimedia object referred to as "Video1" at 504 may be output upon receipt of an indication of transaction approval, while a different multimedia object, "Song2," may be output upon receipt of an indication of transaction decline, as shown at 505. In some non-limiting aspects or examples, a user or customer may select a preferred or default device for outputting the multimedia objects selected at 504 and 505 respectively, which may include a merchant acceptance device, as is shown at 506. At 507, a user or account holder may also select a secondary or backup output device for use in instances in which the default output device specified in 506 is available or incapable of retrieving or outputting a multimedia object. Update button 508 may be pressed or clicked by a user of computing device 501 to save or store the values entered or changed in application 502.

In some non-limiting aspects or examples, computing device 501 may be capable of operation as a payment or transaction acceptance device and may also be capable of outputting a multimedia object associated with an account number. In such instances, computing device 501 may also be operated by a merchant, and may receive a request to perform a transaction, and may generate a transaction request message and/or authorization request message and submit such a message to a payment network or other financial institution.

Figure 6:
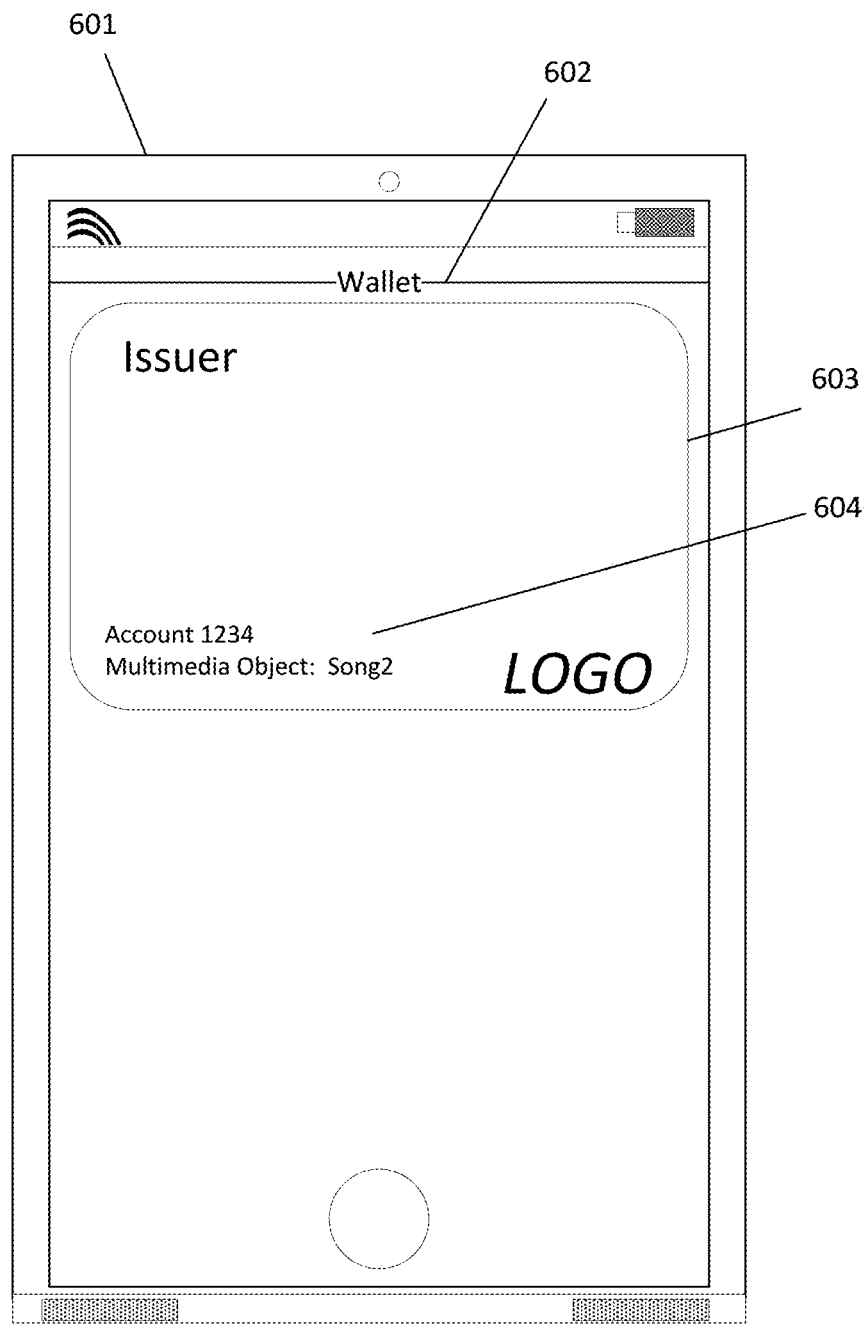
FIG. 6 depicts an illustrative non-limiting example of a digital wallet application on a computing device displaying the currently associated multimedia object with an account number.

Turning now to FIG. 6, an illustrative non-limiting example of a digital wallet application on a computing device displaying the currently associated multimedia object with an account number is depicted. In some non-limiting examples or aspects, a customer may wish to perform a transaction using a computing device 601 via a wallet 602 executing thereon, such as Apple Pay®, Android Pay®, an issuer wallet, or any suitable application. Such a transaction may occur in-person over a short-range wireless communication channel, such as NFC, between computing device 601 and an acceptance device, or it may occur via e-commerce in a web browser communicating with a merchant's server over the Internet or through an application executing on computing device 601, which is commonly known as an "in-app" transaction. In some non-limiting aspects or examples, an account credential may be provisioned to wallet 602 using a variety of interactions between wallet 602 and a payment network, issuer financial institution, or a token requestor. In some non-limiting examples or aspects, during or after account credential provisioning, an issuer, payment network, or any other suitable entity may also provide information to wallet 602 about a multimedia object currently associated with the particular account, and card 603, such that the currently associated multimedia object 604 may be visible to the user of computing device 601 when they attempt to perform a transaction. In conducting a transaction using card 603, a user may also transmit to an acceptance device an updated multimedia object 604, which an acceptance device may include as part of a transaction request message, which, when received by a payment network, issuer, or other entity, may be used to update a particular multimedia object associated with card 603 and its associated account credentials.

It should be understood and appreciated by a person of skill in the art that nothing in the above is intended to limit the functionality and structures described herein. The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents. One or more features from any non-limiting embodiments or aspects may be combined with one or more features of any other embodiment or aspect without departing from the scope of the disclosure. A recitation of "a", "an" or "the" is intended to mean "one or more" unless specifically indicated to the contrary. All patents, patent applications, publications, and descriptions mentioned above are herein incorporated by reference in their entirety for all purposes. None is admitted to be prior art.

What is claimed is:

1. A method for personalizing a transaction, comprising:
   receiving, by a merchant acceptance device comprising a point-of-sale system, an account credential;
   generating, by the merchant acceptance device, a transaction request message comprising at least the account credential and a request to associate a multimedia object with the account credential, the transaction request message formatted according to a standardized message format;
   transmitting, by the merchant acceptance device, the transaction request message to a payment network;
   receiving, by the merchant acceptance device from the payment network, a transaction response message formatted according to the standardized message format and comprising an indication of whether the transaction was approved or declined and a uniform resource identifier (URI), wherein the URI comprises a location at which the multimedia object is located;
   extracting, by the merchant acceptance device, the URI from the transaction response message;
   retrieving, by the merchant acceptance device, the multimedia object associated with the account credential based on the URI;
   in response to retrieving the multimedia object, forwarding, by the merchant acceptance device, the multimedia object to an output-capable computing device;
   receiving, by the output-capable computing device, the multimedia object from the merchant acceptance device; and
   outputting, by the output-capable computing device, the multimedia object by at least one of the following: audibly playing the multimedia object on a speaker, visually displaying the multimedia object on a display screen, or any combination thereof.

2. The method of claim 1, wherein the transaction request message further comprises an indication that the merchant acceptance device is not capable of outputting the multimedia object.

3. The method of claim 1, wherein the transaction request message further comprises an updated selection of the multimedia object.

4. The method of claim 1, wherein receiving the account credential comprises retrieving, from a memory, the account credential based on a computing device initiating a transaction with the merchant acceptance device.

5. The method of claim 1, further comprising, receiving by the merchant acceptance device, a request to select, update, or change the multimedia object associated with the account credential from the output-capable computing device.

6. The method of claim 1, wherein the output-capable computing device is a computing device associated with a user.

7. A system for personalizing a transaction, comprising:
   a merchant acceptance device comprising a point-of-sale system and configured to:
     receive an account credential;
     generate a transaction request message comprising at least the account credential and a request to associate a multimedia object with the account credential, the transaction request message formatted according to a standardized message format;
     transmit the transaction request message to at least one server of a payment network;
     receive from the at least one server of the payment network a transaction response message formatted according to the standardized message format and comprising an indication of whether the transaction was approved or declined and a uniform resource identifier (URI), wherein the URI comprises a location at which the multimedia object is located;
     extract the URI from the transaction response message;
     retrieve a multimedia object associated with the account credential based on the URI; and
     in response to retrieving the multimedia object, forward the multimedia object to an output-capable computing device; and
   wherein the output-capable computing device comprises at least one processor configured to:
     receive the multimedia object from the merchant acceptance device; and
     output the multimedia object by at least one of the following: audibly playing the multimedia object on a speaker, visually displaying the multimedia object on a display screen, or any combination thereof.

8. The system of claim 7, wherein the transaction request message further comprises an indication that the merchant acceptance device is not capable of outputting the multimedia object.

9. The system of claim 7, wherein the transaction request message further comprises an updated selection of the multimedia object.

10. The system of claim 7, wherein when receiving the account credential, the merchant acceptance device is configured to retrieve, from a memory, the account credential based on a computing device initiating a transaction with the merchant acceptance device.

11. The system of claim 7, further comprising, receiving by the merchant acceptance device, a request to select, update, or change the multimedia object associated with the account credential from the output-capable computing device.

12. The system of claim 7, wherein the output-capable computing device is a computing device associated with a user.

* * * * *